(12) United States Patent
North et al.

(10) Patent No.: US 9,946,778 B2
(45) Date of Patent: Apr. 17, 2018

(54) SYSTEM AND METHOD FOR COPYING DATA

(75) Inventors: Andrew North, Edinburgh (GB);
Derek English, Edinburgh (GB); Barry M. Messenger, Edinburgh (GB);
Gerard Robertson, Edinburgh (GB)

(73) Assignee: STANDARD LIFE EMPLOYEE SERVICES LIMITED, Edinburgh (GB)

( * ) Notice: Subject to any disclaimer, the term of this patent is extended or adjusted under 35 U.S.C. 154(b) by 197 days.

(21) Appl. No.: 13/822,151

(22) PCT Filed: Sep. 9, 2011

(86) PCT No.: PCT/GB2011/001320
§ 371 (c)(1),
(2), (4) Date: Apr. 19, 2013

(87) PCT Pub. No.: WO2012/032299
PCT Pub. Date: Mar. 15, 2012

(65) Prior Publication Data
US 2013/0218833 A1    Aug. 22, 2013

(30) Foreign Application Priority Data
Sep. 9, 2010   (GB) .................................. 1014986.2

(51) Int. Cl.
*G06F 7/00*  (2006.01)
*G06F 17/00* (2006.01)
*G06F 17/30* (2006.01)

(52) U.S. Cl.
CPC .. *G06F 17/30575* (2013.01); *G06F 17/30563* (2013.01); *G06F 17/303* (2013.01)

(58) Field of Classification Search
CPC ......... G06F 17/30575; G06F 17/30563; G06F 17/303
See application file for complete search history.

(56) References Cited

U.S. PATENT DOCUMENTS 6,189,010 B1 *  2/2001  Isip, Jr. ............. G06F 17/30371
7,337,176 B1 *  2/2008  Cheedella ......... G06F 17/30563
(Continued)

OTHER PUBLICATIONS

International Search Report for Application No. PCT/GB2011/001320 dated Sep. May 9, 2012.
(Continued)

*Primary Examiner* — Azam Cheema
(74) *Attorney, Agent, or Firm* — Marshall, Gerstein & Borun LLP; Randall G. Rueth (57) ABSTRACT

The present invention relates to a system and method for copying data between environments in an information management system such as the copying of business data between production and test environments in a database system. The system has a relations database with a set of relations created outside the runtime environment which are derived from a first database and which provide a link between database tables in the first database. The system also has a service generator which extracts and copies database tables at runtime to form a predetermined service or product. When the service generator receives a request to copy a product or service, this is done only if the data in the database tables comprising the product or service is the subject of one or more relation in the relations database.

22 Claims, 4 Drawing Sheets

(56) References Cited

U.S. PATENT DOCUMENTS

| | | |
|---|---|---|
| 7,620,665 B1 | 11/2009 | George et al. |
| 2003/0110179 A1 | 6/2003 | Barton |
| 2005/0187974 A1 | 8/2005 | Gong |
| 2006/0053112 A1* | 3/2006 | Chitkara ........... G06F 17/30595 |

OTHER PUBLICATIONS

Written Opinion for Application No. PCT/GB2011/001320 dated May 9, 2012.

* cited by examiner

SYSTEM AND METHOD FOR COPYING DATA

The present invention relates to a system and method for copying data between environments in an information management system and in particular to the copying of business data between production and test environments in a database system.

BACKGROUND TO THE INVENTION

Database systems are used in a wide range of enterprises for the storage and manipulation of data. The data could, for example, relate to a customer's personal information and information on the products and services that they have purchased. Relational database systems such as IBM DB2 UDB are used to store this type of data.

Database systems depend on stored metadata for the normal operation of a database instance. A database system uses this information when serving user requests, in the form of either DML (data manipulation language) statements or calls from database utilities. In DB2 UDB, this metadata information is stored as database tables and views called system catalog views. Application developers can use metadata to manipulate a database object when developing applications. The DB2 database manager uses system catalog views and database instances while serving requests from users. Data management is provided using a structured query language SQL; this provides data query and update, schema creation and modification, and data access control.

Initially, relational database systems operated with embedded or static SQL. Static SQL statements are written within an application program and are pre-processed by a database dependent SQL preprocessor before the application is compiled. In the preprocessing stage, a DB2 package is created which is bound outside the compile process. The bind process determined the access path.

Open Database Connectivity ODBC facilitated the creation of dynamic SQL because it allowed SQL to be created that did not have to be embedded into the application programming language, and pre-compilation was no longer required.

Therefore static SQL statements in an application do not change at runtime and can be hard-coded into the application. Dynamic SQL statements are constructed at runtime to allow users to enter their own queries. Thus, the dynamic SQL statements cannot be hard-coded into the application. Static SQL provides performance advantages over dynamic SQL because static SQL is pre-processed, which means the statements are parsed, validated, and optimized only once.

In many applications, database systems contain millions of data tables and there is an ongoing need to be able to create queries which copy data from one environment to another. This can be as a result of the need to test an improvement to the database or a new product before live use.

Testing requires data created within a test environment. This is usually data that is extracted from an alternative environment and loaded into the test environment which is often a production environment. In many cases, because of the complex inter-relationships between data in the database, the tester may not know exactly which data is required. The data chosen by the tester may have underlying data requirements that are not apparent. Where a test is performed on incomplete data an error will occur. The problem with errors is that it is not immediately apparent to the tester whether the error has arisen from a failure to properly specify the required data or whether there is a more fundamental problem with the test itself.

Another issue is that of CPU capacity. In many cases, organisations will buy database services from a supplier; this will include the purchase of processing capacity. The ability to copy data from one environment to another requires a user to create their own database queries which have a large draw on the available processing capacity. In practice, this problem is controlled by carefully managing the queries that are created by users and running the queries at times when the system processing capacity is underused such as in the evening or at weekends. This is inconvenient for the users and slows down the development process considerably. Product service

SUMMARY OF THE INVENTION

It is an object of the present invention to provide an improved system and method for copying data.

In accordance with a first aspect of the invention there is provided a system for copying data from a first to a second environment in an information management system, the system comprising:

a relations database comprising a set of relations derived from a first database, said relations providing a link between database tables in the first database, wherein the relations database is created outside the runtime environment;

a service generator which extracts and copies database tables at runtime to form a predetermined service or product, wherein the service generator, upon receiving a request to copy a product or service, does so only if the data in the database tables comprising the product or service is the subject of one or more relation as contained within the relations database.

Preferably, the data in the database tables comprising the product or service is the subject of one or more relation as contained within the relations SQL commands.

Preferably, one or more type of relation is present in the relations database.

Preferably, a first type of relation is the presence of an index for preselected data in the database table.

Preferably, the relation is a referential integrity relation.

Preferably, where database tables are related as referential integrity parent and child, data from both tables will be extracted.

Preferably, the relation is an application relation.

Preferably, the system further comprises input means to allow a user to create application relations between data tables in the first database and to allow the data tables to be included in the relations database.

By using static SQL instead of dynamic SQL less CPU capacity is required to create copies. This means that copies can be created at any time for testing.

Preferably, the service generator comprises encryption means for encrypting and decrypting data in database tables.

Preferably, the encryption means comprises one or more SQL statement.

Preferably, the service generator further comprises a tracking mechanism so that if the data has already been retrieved from a table then it is not re-read and subsequently reprocessed.

By generating the possible static SQL statements and including a mechanism to read data once, the service generator provides a highly re-usable component that can meet any extract requirement as efficiently as possible. By including the calls to programs to retrieve parent rows the service generator also ensures that the data extracted will be a complete Referential Integrity set and able to be successfully loaded.

Preferably, the service generator further comprises a delete program which can delete data access paths by accessing the relations database to analyse the table definition and all available indexes upon the table.

Preferably, the service generator comprises a database service generator which identifies the one or more tables that comprise a database service, extracts them from the first database and loads them into a database service.

Preferably, the service generator comprises a product service generator which identifies the one or more database services that comprise a product service, extracts them from the first database and loads them into a database service.

Preferably, the service generator is adapted to create products from the database services.

Preferably, the second environment is a test environment.

In accordance with a second aspect of the invention there is provided a method for copying data from a first to a second environment in an information management system, the method comprising:

creating a relations database comprising a set of relations derived from a first database, said relations providing a link between database tables in the first database, wherein the relations database is created outside the runtime environment;

generating services by extracting and copying database tables at runtime to form a predetermined service or product, wherein upon receiving a request to copy a product or service, the service is generated only if the data in the database tables comprising the product or service is the subject of one or more relation as contained within the relations database.

Preferably, one or more type of relation is present in the relations database.

Preferably, a first type of relation is the presence of an index for preselected data in the database table.

Preferably, the relation is a referential integrity relation.

Preferably, where database tables are related as referential integrity parent and child, data from both tables will be extracted.

Preferably, the relation is an application relation.

Preferably, the system further comprises input means to allow a user to create application relations between data tables in the first database and to allow the data tables to be included in the relations database.

By using static SQL instead of dynamic SQL less CPU capacity is required to create copies. This means that copies can be created at any time for testing.

Preferably, the service generator comprises encryption means for encrypting and decrypting data in database tables.

Preferably, the encryption means comprises one or more SQL statement.

Preferably, the service generator further comprises a tracking mechanism so that if the data has already been retrieved from a table then it is not re-read and subsequently reprocessed.

By generating the possible static SQL statements and including a mechanism to read data once, the service generator provides a highly re-usable component that can meet any extract requirement as efficiently as possible. By including the calls to programs to retrieve parent rows the service generator also ensures that the data extracted will be a complete Referential Integrity set and able to be successfully loaded.

Preferably, the service generator further comprises a delete program which can delete data access paths by accessing the relations database to analyse the table definition and all available indexes upon the table.

Preferably, the service generator comprises a database service generator which identifies the one or more tables that comprise a database service, extracts them from the first database and loads them into a database service.

Preferably, the service generator comprises a product service generator which identifies the one or more database services that comprise a product service, extracts them from the first database and loads them into a database service.

Preferably, the service generator is adapted to create products from the database services.

Preferably, the second environment is a test environment.

BRIEF DESCRIPTION OF THE DRAWINGS

The present invention will now be described by way of example only with reference to the accompanying drawings in which.

DETAILED DESCRIPTION OF THE DRAWINGS

Figure 1:
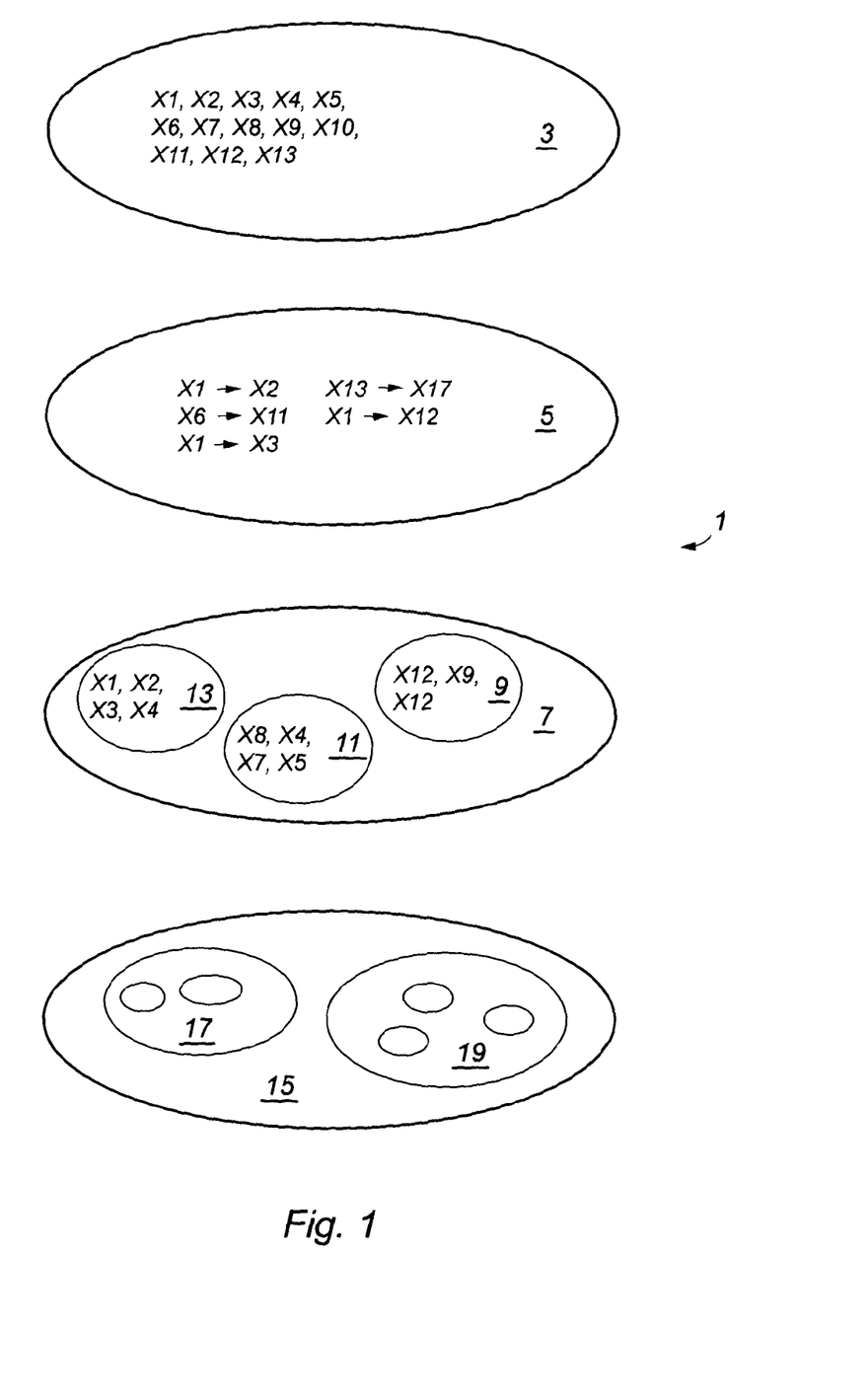
FIG. 1 is an illustration of the structure of a system in accordance with the present invention.

FIG. 1 is an illustration of the structure of a system in accordance with the present invention with a database. In the figure, shown generally at reference numeral 1, an IBM DB2 database 3 is shown which comprises a plurality of data tables denoted as X1 to X13 . . . , each of these databases comprises fields for holding information on, for example, a person's name, address, telephone number and other matters such as insurance policy numbers, financial services products, intermediary details and so on. Within the data tables, at least some of the fields may be indexed. It is well known that indexing makes data in large databases easier to search.

The relations database 5 comprises a set of information on data tables which have been derived from database 3 where the data tables contain a relation which is valid for the purpose of defining links and relationships between data tables. In this example of the present invention the valid relations are those which define or describe data indexing, an application relation or referential integrity between parent and child database tables.

The database service 7 comprises a number of tables which are to be found via the relations database and which make up database services such as customer details 9, payments 11, invoices 13 or the like. These database services, in turn are used to create product services as shown generally by reference numeral 15 and by reference numerals 17 and 19.

The present invention provides a system and method for copying data that is fast and efficient. By creating a relation database and prescribing the use of data tables in a database which are referred to in the relation database, the present invention ensures that well defined pathways created outside the runtime environment are the ones that are used to create database services and product services. In known copying tools, the determination of pathways between data tables, the calculation and identification of which databases are required and which pathways are to be used is made at run time using dynamic SQL. This requires significant processor power and in some examples has been calculated as slower than using the present invention by a factor of 100.

Figure 2:
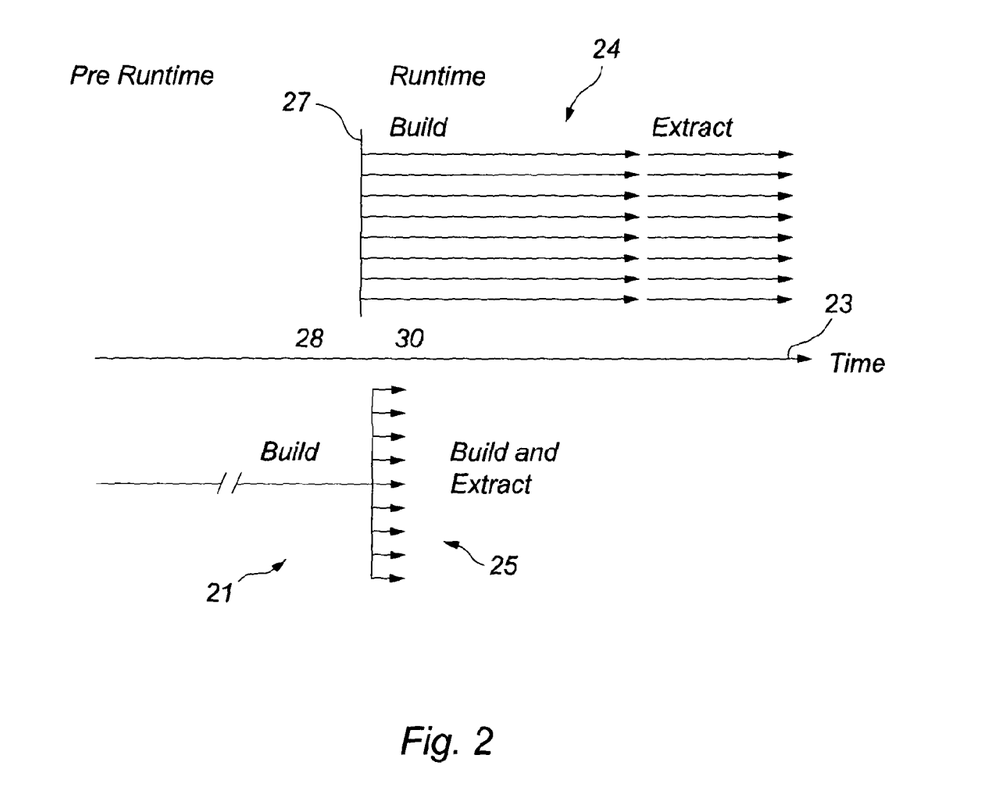
FIG. 2 is a schematic diagram which illustrates an advantage of the present invention when compared to the prior art.

FIG. 2 is a schematic diagram which illustrates an advantage of the present invention when compared to the prior art.

The FIG. 21 shows a time line 23 which illustrates the time involved in making a copy of data between environments using the prior art 24 and the present invention 25. The time line is divided by a vertical line 27 which marks the notional change between the pre-runtime environment and the runtime environment for a database system.

As described above, the use of dynamic SQL requires much more processing, and also requires a repeat of many of the processing steps. In contrast, the present invention uses the relations database to provide predefined data pathways and definitions which can be used with static SQL and requires little in the way of runtime processing.

Figure 3:
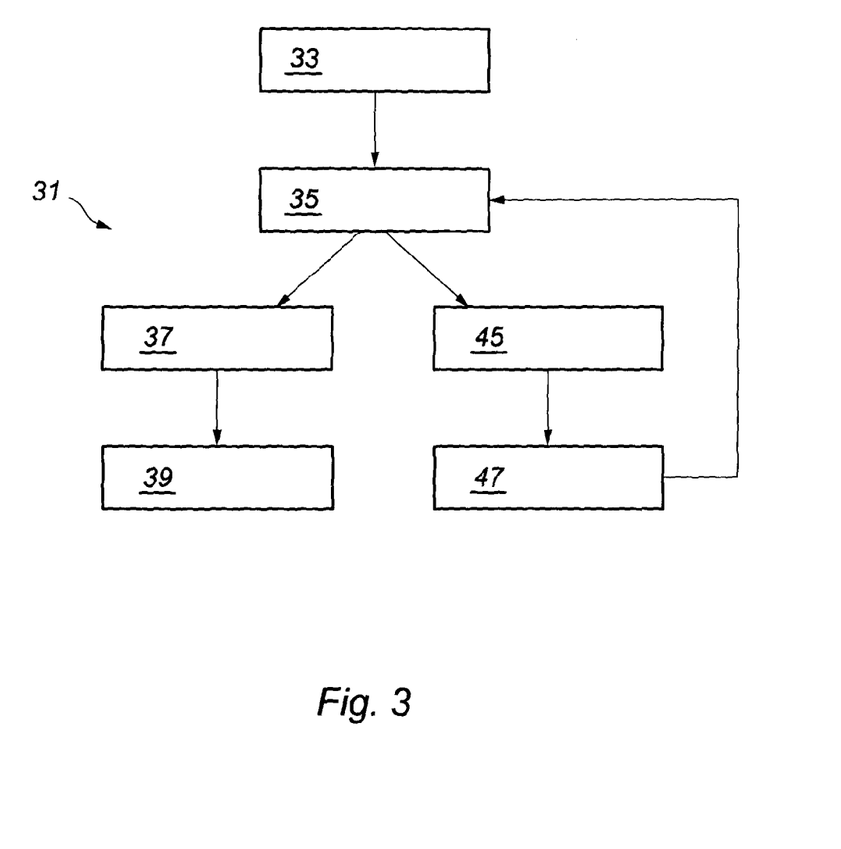
FIG. 3 is a flow diagram which shows the process of copying data in accordance with the example of the present invention.

FIG. 3 is a flow diagram 31 which describes an overview of an example of the process in accordance with the present invention. In this example, a user defines 33 a set of data, such as a new product which is to be copied for test purposes. In this example of the invention, the overall set of data tables is contained in a DB2 Catalogue. A subset of these tables is defined in the Relations Database which describes only data tables which have been indexed or linked to other data tables.

The flow diagram 31 shows a user initiating a copy command 33. This defines a set of data which may form a new or modified product or service which the user wishes to copy and test. A check 35 is made to determine whether all of the data tables within the product or service are indexed i.e. whether all are represented in the relations database. If all are present, the copy is made by first extracting the data 37 then loading the data 39. This process is described in more detail below with reference to the example of FIG. 4. If one or more of the data tables is absent from the relations database, the user is informed 45 and asked to create a relation to allow the data table to be added to the relations database. Once all of the non-indexed data tables for the product or service have been defined in the relations database, the process of copying the product or service may proceed.

Figure 4:
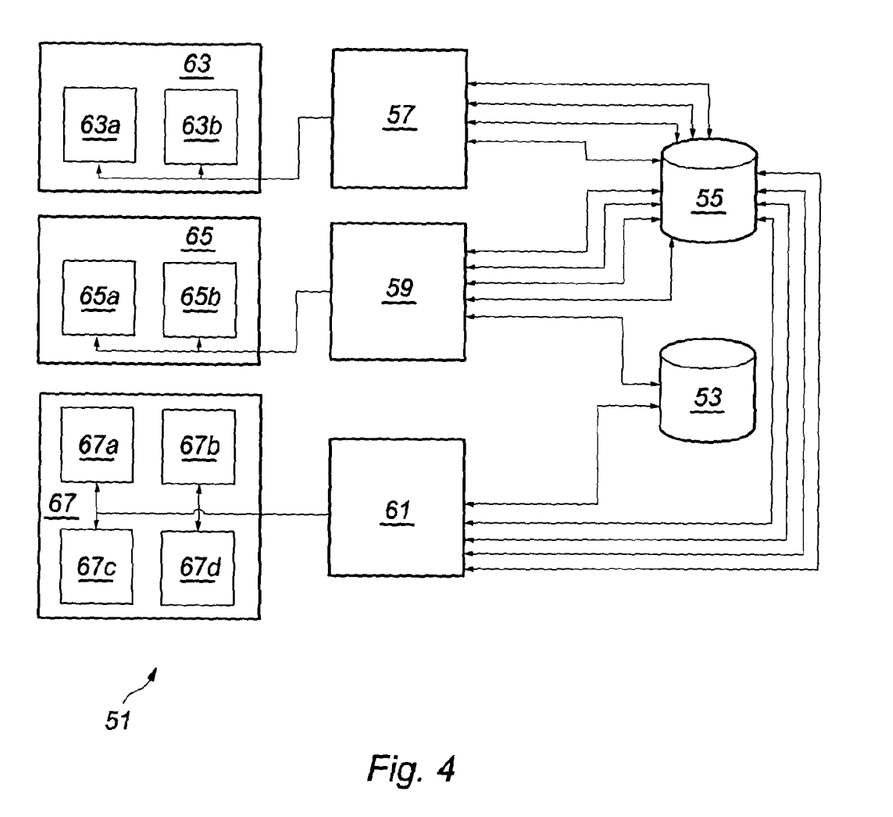
FIG. 4 shows a schematic overview of an embodiment of a system in accordance with the present invention.

FIG. 4 shows an embodiment of a system in accordance with the present invention. The system 51 is designed to allow quick and easy copying of user defined products and services and comprises a DB2 catalogue 53 which contains all of the data tables which may be useable to create a product or service, a relations database 55 which, in this example comprises information concerning a subset of the databases contained in the DB2 catalogue 53. This subset is of indexed or linked data tables.

The system further comprises a product service generator 57, a database service generator 59 and a data access generator 61 which implement product services 63, data services 65 and data access services 67. Each product service comprises one or more data access service and/or data service. In each case data can be extracted and loaded and in the case of data access services, encryption 67b and data deletion 67d may be implemented.

As previously described, the relations database 55 contains information on data tables which allows the data tables to be used in the creation/copying of products and services. In this example, the relations database 55 contains the following information:

The name of the Data Access program for a table;
Table to table relationships;
Available indexes;
which tables form a Database Service;
which Database Services form a Product Service; and
encryption requirements.

The Data Access Generator 61 creates database services from data tables. In order to achieve this it generates up to 5 COBOL programs which are required for data extraction and loading as well as supporting copybook definitions and bind statements.

The programs generated are:
Extract Program;
RI Parent program;
Encryption program;
Delete Program; and
Load program.

For data extraction, in this example, there are up to 3 programs:
Data Extract Program;
RI Parent program; and
Encryption program.

The table extract program contains a separate piece of SQL to select all columns for each possible access path to the selected data. The Generator does this by accessing both the IBM DB2 catalog 53 and the relations database 55 to analyse the table definition and its available indexes.

Where data encryption is required, the Data Access Generator 61 will implement the code to do the encryption. This encryption will be done within the SQL statement where possible but if this is not possible the Data Access Generator 61 will put the encryption in a separate encryption program and call that from the table extract program.

By accessing the relations database 55 and the DB2 database 53, the Data Access Generator 61 is aware of other tables that are related to the one being generated. This will either be a relationship defined within the relations database but derived from information on the DB2 database or one which is user defined. For each relationship the Data Access Generator 61 will identify the program to be called and insert the code to make the call.

Where the data is being extracted from a table that is an RI child of another table the Generator will put in a program call to retrieve the parent data. This data will be required to successfully load the data from the table being generated. Code will be created to determine whether to call the table extract program for the parent table or the RI parent program. Irrespective of which program is called the Generator will set the input parameters to retrieve the parent data as efficiently as possible.

The present invention also has a tracking mechanism so that if the data has already been retrieved from a table then it is not re-read and subsequently reprocessed. The Data Access Generator 61 will insert the appropriate code to make available the means to check to see if the data has already been read before it executes the SQL.

The Data Access Generator 61 is provided with information to determine when an RI parent program is required by interrogating the relationships on the table within the relations database. The RI parent program will only be called with the full primary key and the Data Access Generator 61 will generate SQL to meet that requirement. Before accessing the data the Data Access Generator 61 will put in any calls required to retrieve the parent data for this table.

Where encryption is required, the encryption program does the encryption that cannot be done as part of the SQL in the table extract program. The Data Access Generator 61 produces this program when encryption exists on the table and will know whether the desired encryption needs to be done in this program or can be done as part of the extract SQL. The results of the encryption are written to a log at runtime.

Once data which is fully indexed has been extracted from the DB2 database, the data which forms a database service is loaded. For data loading there are 2 programs generated:
DB2 delete Program 67*d*
DB2 load program 67*c*

The DB2 delete 67*d* program contains the SQL to delete all rows for all possible access paths to the data. The Data Access Generator 61 does this by accessing the IBM DB2 catalog to analyse the table definition and all available indexes upon the table. A separate piece of static SQL is generated for all possible access paths to the data.

The DB2 load program 67*c* generates the SQL to insert a row into a table. Where there is a primary key on the table the Data Access Generator 61 will identify this and add UPDATE logic so that existing rows are replaced rather than inserted.

In this example of the present invention, the Database Service Generator 59 generates 2 COBOL programs. The first controls the data extraction process whilst the other will control the data deletion process, if it has been defined. The database service programs 65*a*, 65*b* control what data is logged so that at the end of the job there is detailed information about the data extracted, deleted and loaded. Where data has been encrypted the new versions are written to the log file so that the customer can identify their cases.

As with the Data access Generator 61, the Database Service Generator 59 identifies the tables that have been defined to the copy system as being part of the database service and generates a top level routine to control access to the table extract programs. The database service generator 59 will take the table relationships that form the database service from the relations database 55 and set the inputs to all the table extract programs so that the most efficient access path is utilised to retrieve the data.

The Database Service Generator 59 will set parameters in the database service extract program 65*a* that all the table extract programs will use to determine what processing is required. The database service generator understands the RI relationships and will order the calls to the data access routines so that the extracted data appears in the order that it is required to be loaded.

It will also determine the level of tracking required based on data stored within the copy system.

The database service generator 59 identifies the tables that have been defined to the relations database 55 as requiring the data to be deleted prior to loading. The database service generator 59 will work out the best access path to delete the data based on the way in which the delete has been defined to the copy system and the available indexes. It will then set the inputs to the DB2 delete program to delete the data using the best access path available. The database service generator 59 will delete the data in the order that has been defined to the relations database 55.

The product service generator 57 generates skeleton JCL (job control language) and control files to run the database services that form a product service. The product service JCL will take data from a single source environment and load it to potentially multiple target environments.

For each product service defined to the copy system, there is information stored as to all the possible source environments and all possible target environments. The product service generator uses this information to generate control cards to drive the generation of the appropriate jobs to extract and load the data based on user input.

It also generates skeleton JCL to carry out the extract and load process. There are three types of jobs generated:
Driver Job;
Extract Phase; and
Load Phase.

There are occasions when it is not possible to generate a piece of JCL to meet a requirement. The Generator allows exit points to be defined where a manually written procedure can be included in the job flow.

There are 2 main types of special requirements that can be included:
Conversion Exit—This will change the data that has been extracted based on information in the test environment. The most common reason for this is to change key identifiers so they don't clash with existing data in test.
Supplementary Exit: This will extend the data being extracted based on the data already retrieved. The most common reason for this exit is where data is required but the key data to access the data is dependant on the data already extracted.

The product service generator 57 will generate a driver job that will use the generated skeleton JCL to dynamically build specific jobs to extract and load data based on user input.

The product service generator 57 understands what database services form the product service. For each database service the generator knows which DB2 and IMS subsystems are required to Extract and load the data. It will build all the extract jobs required and submit them on the appropriate subsystems to execute.

The Driver job will set up the starting point for job tracking to enable the copy system to follow the complete progress of the extract/load process. As part of this it will indicate what jobs will run so that subsequent jobs will know when the entire process is complete.

The product service generator 57 will generate both DB2 and IMS skeleton JCL to extract all the database services that form the product service. Database services will be grouped together by subsystem within which they are to run.

There are times where a database service has an associated service that needs to be included in addition to standard database services that form the product service. The generator knows about these services from the relations database 55 and will include the appropriate JCL to run the supplementary service. It will also set up the Job to load the data, if required, and also set up the necessary JCL so that the job tracking is informed when the job starts and when it finishes.

The product service generator 57 will generate both DB2 and IMS skeleton JCL to load all the data that has been extracted in the extract phase.

The product service generator 57 will know whether there is data to be deleted before it is loaded and will include a call to the appropriate Database delete service. Using information stored in the relations database 55 the product service generator 57 knows when there is data in the files that needs conversion either based on predefined rules or on values stored on the target environment. The product service generator 57 will put in the necessary calls to carry out this conversion. It will then invoke a generic program to load the data from the extract files. It will set up the necessary JCL so that the job tracking is informed when the job starts and when it finishes. When all jobs are complete the originating user will be informed.

The present invention provides a tool for copying data between environments which greatly improves the speed and efficiency of the copying process. The overall effect of this is to increase the amount of product testing that can be done which improves product reliability and reduces errors.

Improvements and modifications may be incorporated herein without deviating from the scope of the invention.

The invention claimed is:

1. A computer hardware based system for copying data from a production environment to a test environment in an information management system, the system comprising:
   a storage device storing a relations database comprising a set of relations derived from a first database in the production environment, said relations providing a link between database tables in the first database, wherein the storage device storing the relations database is created outside a runtime environment;
   a service generator which extracts and loads database tables at runtime to form a predetermined service or product, wherein
   the service generator, upon receiving a request to copy production environment data to create a product or service to be tested in the test environment, checks the storage device storing the relations database to determine whether the database tables within the product or service which are to be created by the service generator are indexed in the storage device storing the relations database and copies production environment data, only if data in the database tables comprising the product or service is a subject of one or more relation as contained within the storage device storing the relations database and wherein, one or more type of relation is present in the storage device storing the relations database, including:
   a. a referential integrity relation in which database tables are related as referential integrity parent and child such that data from both parent and child tables will be extracted;
   b. which database tables form a database service; and
   c. which database services form a product service.

2. A computer hardware based system as claimed in claim 1 wherein, the data in the database tables comprising the product or service is the subject of one or more relation as contained within a relation's SQL commands.

3. A computer hardware based system as claimed in claim 1 wherein, a first type of relation is a presence of an index for preselected data in the database table.

4. A computer hardware based system as claimed in claim 1 wherein, the relation is an application relation.

5. A computer hardware based system as claimed in claim 1 wherein, the system further comprises input means to allow a user to create application relations between data tables in the first database and to allow the data tables to be included in the relations database.

6. A computer hardware based system as claimed in claim 1 wherein, the service generator comprises encryption means for encrypting and decrypting data in database tables.

7. A computer hardware based system as claimed in claim 6 wherein, the encryption means comprises one or more SQL statement.

8. A computer hardware based system as claimed in claim 1 wherein, the service generator further comprises a tracking mechanism so that if the data has already been retrieved from a table then it is not re-read and subsequently reprocessed.

9. A computer hardware based system as claimed in claim 1 wherein, the service generator comprises a database service generator which identifies one or more tables that comprise a database service, extracts the one or more tables from the first database and loads the one or more tables into the database service.

10. A computer hardware based system as claimed in claim 9 wherein, the service generator is adapted to create products from the database service.

11. A computer hardware based system as claimed in claim 1 wherein, the service generator comprises a product service generator which identifies one or more database services that comprise a product service, extracts the one or more database services from the first database and loads the one or more database services into the product service.

12. A method for copying data from a production environment to a test environment in an information management system, the method comprising:
   creating a relations database comprising a set of relations derived from a first database in the production environment, said relations providing a link between database tables in the first database, wherein the relations database is created outside a runtime environment;
   generating services by extracting and copying database tables at runtime to form a predetermined service or product, wherein
   upon receiving a request to copy data from the production environment to create a product or service in the test environment, a check is made of the relations database to determine whether the database tables within the product or service to be created by the service generator are indexed in the relations database and copies in the data to generate the product or service only if data in the database tables comprising the product or service is the subject of one or more relation as contained within the relations database including:
   a. wherein, one or more type of relation is present in the relations database, a referential integrity relation in which database tables are related as referential integrity parent and child, such that data from both parent and child tables will be extracted;
   b. which database tables form a database service; and
   c. which database services form a product service.

13. A method as claimed in claim 12 wherein, the data in the database tables comprising the product or service is the subject of one or more relation as contained within a relations SQL commands.

14. A method as claimed in claim 12 wherein, a first type of relation is a presence of an index for preselected data in the database table.

15. A method as claimed in claim 12 wherein, the relation is an application relation.

16. A method as claimed in claim 12 wherein, the method further allows a user to create application relations between data tables in the first database and to allow the data tables to be included in the relations database.

17. A method as claimed in claim 12 wherein, the step of generating services comprises encrypting and decrypting data in database tables.

18. A method as claimed in claim 17 wherein the step of encrypting or decrypting uses one or more SQL statement.

19. A method as claimed in claim 17 wherein, the step of generating services further comprises a tracking mechanism so that if the data has already been retrieved from a table then it is not re-read and subsequently reprocessed.

20. A method as claimed in claim 17 wherein, the step of generating services further comprises generating data services to identify one or more tables that comprise a database service, extracts the one or more tables from the first database and loads the one or more tables into the database service.

21. A method as claimed in claim 20 wherein, the step of generating services further comprises, identifying one or more database services that comprise a product service, extracts the one or more database services from the first database and loads the one or more database services into the product service.

22. A method as claimed in claim 20 wherein, the step of generating services further comprises creating products from the database service.

\* \* \* \* \*